US008314985B2

(12) United States Patent
Kuang

(10) Patent No.: US 8,314,985 B2
(45) Date of Patent: Nov. 20, 2012

(54) SURFACE PLASMON OPTICAL MODULATOR

(75) Inventor: Wan Kuang, Boise, ID (US)

(73) Assignee: Boise State University, Boise, ID (US)

( * ) Notice: Subject to any disclaimer, the term of this patent is extended or adjusted under 35 U.S.C. 154(b) by 305 days.

(21) Appl. No.: 12/607,895

(22) Filed: Oct. 28, 2009

(65) Prior Publication Data

US 2010/0103495 A1   Apr. 29, 2010

Related U.S. Application Data

(60) Provisional application No. 61/109,066, filed on Oct. 28, 2008.

(51) Int. Cl.
*G02F 1/03* (2006.01)
*G02F 1/07* (2006.01)

(52) U.S. Cl. .......................................... 359/263; 359/245

(58) Field of Classification Search .................. 359/245, 359/263; 385/130; 356/445
See application file for complete search history.

(56) References Cited

U.S. PATENT DOCUMENTS

| 4,432,615 | A | | 2/1984 | Ikemori |
| 4,482,779 | A | * | 11/1984 | Anderson ..................... 136/255 |
| 4,915,482 | A | | 4/1990 | Collins et al. |
| 5,067,788 | A | | 11/1991 | Jannson et al. |
| 5,570,139 | A | | 10/1996 | Wang |
| 6,034,809 | A | | 3/2000 | Anemogiannis |
| 6,611,367 | B1 | * | 8/2003 | Naya et al. .................... 359/299 |
| 7,010,183 | B2 | | 3/2006 | Estes et al. |
| 7,177,515 | B2 | | 2/2007 | Estes et al. |

OTHER PUBLICATIONS

J. Pendry, "Playing tricks with light", Science, vol. 285, No. 5434, pp. 1687-1688, Sep. 1999.
W. L. Barnes, A. Dereux, and T. W. Ebbesen, "Surface plasmon subwavelength optics", Nature, vol. 424, pp. 824-830, Aug. 2003.
W. Nomura, M. Ohtsu, and T. Yatsui, "Nanodot coupler with a surface plasmon polariton condenser for optical far/near-field conversion", Applied Physics Letters, vol. 86, No. 18, p. 181108-1 to 3, 2005.
E. Ozbay, "Plasmonics: Merging Photonics and Electronics at Nanoscale Dimensions," Science, vol. 311, No. 5758, pp. 189-193, Jan. 2006.
M. E. Caldwell and E. M. Yeatman, "Surface-plasmon spatial light modulators based on liquid crystal", Applied Optics, vol. 31, No. 20, pp. 3880-3891, Jul. 1992.
A. V. Krasavin, A. V. Zayats, and N. I. Zheludev, "Active control of surface plasmon-polariton waves", Journal of Optics A: Pure and Applied Optics, vol. 7, No. 2, pp. S85-S89, 2005.

(Continued)

*Primary Examiner* — Ricky Mack
*Assistant Examiner* — Mahidere Sahle
(74) *Attorney, Agent, or Firm* — Pedersen and Company, PLLC; Ken J. Pedersen; Barbara S. Pedersen

(57) ABSTRACT

A high-speed optical modulator based on Surface Plasmon-Polariton (SPP) at the hetero-junction of a metal-insulator-semiconductor (MIS) tunneling diode and including a phase-matching optical element, such as a prism or gold-lattice structure, is described. An investigation using the coupled mode theory shows that the applied bias across the hetero-junction changes the optical reflectance of an optically coupled MIS tunneling diode, such as a prism-coupled MIS tunneling diode or a gold lattice-coupled MIS tunneling diode, while the modulation efficiency achievable of the device depends on the thickness of the metal film used to construct the tunneling diode.

2 Claims, 5 Drawing Sheets

OTHER PUBLICATIONS

K. K. Thornber, T. C. McGill, and C. A. Mead, "The tunneling time of an electron", Journal of Applied Physics, vol. 38, No. 5, pp. 2384-2385, Apr. 1967.

M. Büttiker and R. Landauer, "Traversal Time for Tunneling", Physical Review Letters, vol. 49, No. 23, pp. 1739-1742, Dec. 1982.

V. S. Olkhovsky and E. Recami, "Recent developments in the time analysis of tunneling processes", Physics Reports, vol. 214, pp. 339-356, May 1992.

B. Little, S. Chu, H. Haus, J. Foresi, and J. Laine, "Microring resonator channel dropping filters", Journal of Lightwave Technology, vol. 15, No. 6, pp. 998-1005, Jun. 1997.

J. Simmons, "Generalized Formula for the Electric Tunnel Effect between Similar Electrodes Separated by a Thin Film", Journal of Applied Physics, vol. 34, No. 6, pp. 1793-1803, 1963.

Z. Burshtein and J. Levinson, "Photo-induced tunnel currents in Al-Al2O3-Au structures", Physical Review B, vol. 12, No. 8, pp. 3453-3457, Oct. 1975.

T. Ma, "High-k gate dielectrics for scaled CMOS technology", in 6th International Conference on Solid-State and Integrated•Circuit Technology, vol. 1, 2001.

J. Robertson, "Electronic structure and band offsets of high-dielectric-constant gate oxides", MRS Bulletin, pp. 217-221, Mar. 2002.

S. Collins, D. Lowe, and J. R. Barker, "The quantum mechanical tunnelling time problem-revisited", Journal of Physics C, Solid State Physics, vol. 20, pp. 6213-6232, Dec. 1987.

G. Lewicki, J. Maserjian, and C. A. Mead, "Barrier energies in MIM structures from photoresponse: Effect of scattering in the insulating film", Journal of Applied Physics, vol. 43, No. 4, pp. 1764-1767, Apr. 1972.

P. B. Johnson and R. Christy, "Optical constants of the noble metals", Physical Review B, vol. 6, No. 12, pp. 4370-4379, Dec. 1972.

W. Kuang, C. Sparks, and L. Bollschweiler, "Development of Metallic Periodic Structures for Surface Plasmon Polariton Sensor", at least as early as Jun. 2007.

* cited by examiner

SURFACE PLASMON OPTICAL MODULATOR

This application claims priority of U.S. provisional patent application Ser. No. 61/109,066, filed on Oct. 28, 2008, entitled "Surface plasmon optical modulator," which is incorporated herein by reference.

BACKGROUND OF THE INVENTION

1. Field of the Invention

The present invention relates to optical intensity modulation and in particular to the use of Surface Plasmon-Polaritons (SPPs) in an optical modulator system.

Optical intensity modulators are an important element for integrated optoelectronics. Surface Plasmon-Polaritons (SPPs) are attractive candidates for this use due to their potential to produce high-speed compact devices. SPPs are surface electromagnetic waves that are trapped at the metal-dielectric interface due to their interaction with valence electrons of the conductor. Recent demonstrations of light guiding on closely spaced metal nano-particles have created interest for nano-photonic devices that will merge photonic and electronic functionalities at nano-scale dimensions. Optical modulators by means of SPPs have been demonstrated by modifying the refractive index of the dielectric medium. However, the fact that electro-optic effects tend to be weak in semiconductors while large electro-optic effects are obtainable only in slower materials, such as liquid crystals, hinders the modulation speed of such proposed devices. The present invention however, improves modulation efficiency (or increases modulation speed) of an optical modulator utilizing Surface Plasmon-Polaritons (SPPs).

Approaches to surface plasmon optical modulation fall into three categories. One category is the "Refractive Index Approach," whereby a high electro-optic dielectric layer is sandwiched between two metal films and wherein modification of the refractive index of the dielectric material results in changes in reflectivity and thus modulates the incident beam.

One implementation of the "Refractive Index Approach," is discussed in the several U.S. Pat. Nos. 4,432,614, 5,067,788, 5,570,139, 6,034,809 and 6,611,367. This approach relies on the surface plasmon resonant angle $\theta$ for a single incident wavelength being a function of dielectric constant $\in_d$. According to this approach, a small 0.1% change of refractive index can result in a change in resonant frequency over 10%.

For a single incident wavelength, the optical reflectivity reaches the minimum at resonant angle $\theta$ and increases as an approximate Lorentz function with the angle $\theta$. For a single incident wavelength at a fixed incident angle, a change of dielectric constant $\in_d$ through the applied bias changes the optical reflectance and thus modulates the optical intensity. This approach uses capacitance as a means to modulate the optical intensity.

Another approach includes the use of a prism whereby the prism performs the function of phase matching so that surface plasmons can be excited by the incident light, as discussed in U.S. Pat. Nos. 4,432,614, 5,570,139 and 6,611,367. Other variations include using gratings and waveguides (as discussed in U.S. Pat. Nos. 5,067,788 and 6,034,809). An applied voltage across a relatively thick dielectric material (e.g., liquid crystal) changes its dielectric constant $\in_d$ and leads to light modulation. The thick dielectric material requires a high dielectric constant $\in_d$ for this principle to be applied. This approach also uses an applied bias to change the refractive index, which results in changing the resonant frequency or resonant angle $\theta$.

Still another implementation of the "Refractive Index Approach," is the approach which includes improving the modulation efficiency by selecting materials of a large electro-optic constant. However, this approach limits the modulation speed as a large electro-optic effect is generally obtainable only in slower reacting materials, such as liquid crystals.

Still another implementation of the "Refractive Index Approach," is discussed in U.S. Pat. No. 6,611,367. The principle in this approach includes the use of exotic materials that may not be able to be integrated with silicon based fabrication processes.

A second category of surface plasmon optical modulation is the "Optical Absorption Approach," where a semiconductor quantum well is formed immediately adjacent to a metal film, light is coupled to the surface plasmon polariton mode and then the absorption of the quantum well is altered by the quantum confined optical absorption region by a quantum Stark shift of the semiconductor.

An implementation of such as an approach is taken in U.S. Pat. No. 4,915,482. The principle in this approach includes the electromagnetic field being absorbed by a semiconductor quantum well and the surface plasmon provides a way to focus the light. This method works for the wavelength corresponding to the band edge of the semiconductor materials being used.

A third category of surface plasmon optical modulation is the "Surface Plasmon Amplification" method where light and tunneling electron coupling is mediated by surface plasmon polaritons. The amplification of surface plasmon in the gain region alters the optical intensity.

Implementations of such an approach are described in U.S. Pat. Nos. 7,010,183 and 7,177,515. This approach uses the tunneling junctions to modulate surface plasmons and gratings or prisms to couple between light and surface plasmons. An implementation of this approach requires that the surface plasmons cause tunneling electrons such that additional surface plasmons are produced in a gain region (amplified) by stimulated emission and that the surface plasmons so produced are then directed into the tunneling junction of the diode (wave guiding). This requires a certain waveguide mechanism for surface plasmons to transport from an optical receiving structure to an optical sending structure, thus allowing for a high loss of such surface plasmons propagation.

The prior art approaches for producing surface plasmon optical modulation all possess limitations as discussed above. Therefore, there is a need for a surface plasmon optical modulation design at the nanometer scale that can be fabricated on semiconductor devices using fabrication techniques and equipment readily available in today's nano-fabrication facilities.

The present invention provides such a surface plasmon optical modulation design which is intended to reduce or eliminate the limitations of the foregoing prior art approaches in highly advantageous ways and which provides still further advantages. The present invention improves modulation efficiency (or increases modulation speed) of optical modulators, and does not require that the light wavelength correspond to the band edge of the semiconductor materials used nor does the present invention require amplification of the surface plasmons of the MIS tunneling diode junction. Furthermore, the present invention does not require wave-guiding to transport surface plasmons from an optical receiving structure to an optical sending structure.

2. Related Art

The following U.S. patents are listed as related art to the present invention:

U.S. Pat. No. 4,432,614, filed Dec. 12, 1982, issued Feb. 21, 1984;
U.S. Pat. No. 4,915,482, filed Oct. 27, 1988, issued Apr., 10, 1990;
U.S. Pat. No. 5,067,788, filed Mar. 21, 1990, issued Nov. 26, 1991;
U.S. Pat. No. 5,570,139, filed May 13, 1994, issued Oct. 29, 1996;
U.S. Pat. No. 6,034,809, filed Mar. 26, 1998, issued Mar. 7, 2000;
U.S. Pat. No. 6,611,367, filed Feb. 7, 2000, issued Aug. 26, 2003;
U.S. Pat. No. 7,010,183, filed Mar. 20, 2002, issued Mar. 7, 2006; and
U.S. Pat. No. 7,177,515, filed May 6, 2002, issued Feb. 13, 2007.

SUMMARY OF THE INVENTION

Accordingly, an aspect of the present invention is a high-speed optical modulator based on Surface Plasmon-Polariton (SPP) at the hetero-junction of a metal-insulator-semiconductor (MIS) tunneling diode and a phase-matching optical element. The intensity modulation in the SPP due to applied bias on a metal-insulator-semiconductor (MIS) tunneling diode is analyzed by the method of coupling modes in time and shows that manipulating the photon-excited electron tunneling leads to a change in surface plasmon resonance. The electron tunneling in the MIS diode reduces the magnitude of surface plasmon back-scattered field, which destructively interferes with the reflection at an optical element-metal interface, such as a prism-gold (Au) interface or a gold lattice-gold (Au) interface.

In another aspect of the present invention, the thickness of the Au layer is shown to have a strong influence in the modulation depth of the surface plasmon. To increase the electron tunneling probability, one can devise a resonant tunneling structure or phase-matching optical structure to function as a barrier to improve the modulation depth of the device, particularly for longer wavelength applications. As mentioned above, the coupling of optical waves to a MIS tunneling diode can be achieved by means other than a prism, such as utilizing a periodically modified metal film, such as a gold lattice structure.

BRIEF DESCRIPTION OF THE DRAWINGS

The present invention may be understood by reference to the following detailed description taken in conjunction with the drawings briefly described hereinafter. The drawings present a preferred implementation of the present invention and serve as an example to practice the invention and thus are not intended to limit the present as will be understood by one of ordinary skill in the art.

DETAILED DESCRIPTION OF THE INVENTION

The following description is presented to enable one of ordinary skill in the art to make and use the invention. Referring to the figures, there is shown at least one, but not the only, embodiment of the invented surface plasmon optical modulator. The present invention relates to optical intensity modulation and in particular to the use of Surface Plasmon-Polaritons (SPPs) in an optical modulator system.

Figure 1:
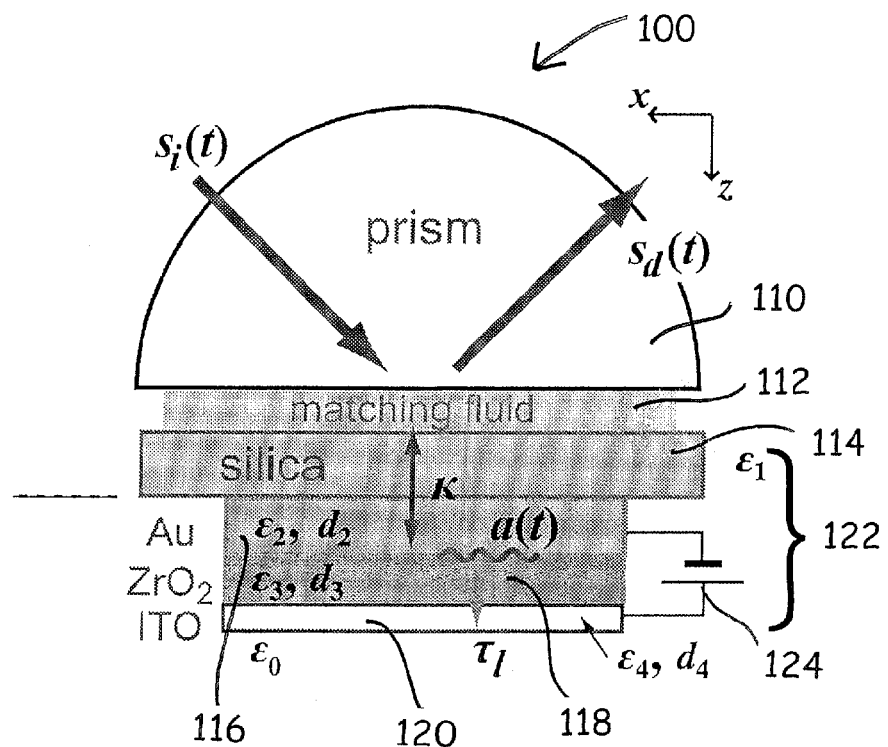
FIG. 1 is an illustration of a metal-insulator-semiconductor (MIS) tunneling diode modulator utilizing a 4 nm zirconium oxide ($ZrO_2$) barrier sandwiched between gold (Au) and indium tin oxide (ITO) layers.

An exemplary implementation of the embodiment illustrated in FIG. 1 represents a surface plasmon optical modulator 100 comprising an MIS tunneling diode modulator 122 utilizing a metal-insulator-semiconductor arrangement and specifically, a 4 nm zirconium oxide ($ZrO_2$) barrier sandwiched between gold (Au) and indium tin oxide (ITO) layers. Fabrication of surface plasmon optical modulator 100, would be carried out in a semiconductor fabrication lab using fabrication techniques known to one of ordinary skill in the art and is thus not discussed.

Referring now to FIG. 1, surface plasmon optical modulator 100 comprises phase-matching optical element 110, such as a prism, periodic structured surfaces, or photonic crystals. Though other optical elements may be used other than a prism, the present invention is described in reference to a prism to serve as one example. A matching fluid 112 resides between prism 110 and an MIS tunneling diode 122, thus providing a coupling therebetween. The MIS tunneling diode 122 is fabricated on silica 112 and utilizes a barrier layer 118, such as zirconium oxide ($ZrO_2$) of approximately 4 nm in thickness, which is sandwiched between a metal layer 116, such as gold (Au) and a semiconducting transparent electrode 120, such as indium tin oxide (ITO). An external bias voltage 124 is applied to tunneling diode 122 by connection to Au layer 116 and ITO layer 120 in order to manipulate the optical reflectance of the prism coupled MIS tunneling diode 122. A preferred embodiment utilizes a barrier layer 118 of zirconium oxide ($ZrO_2$) of approximately 4 nm in thickness, a metal layer 116 of gold (AU) of less than 50 nm in thickness (a thickness of approximately 30 nm-50 nm is preferred) and a transparent electrode 120 of indium tin oxide (ITO).

When applied, external bias voltage 124 drives photo-excited electrons through ($ZrO_2$) barrier 118 and alters the re-emission of light from Surface Plasmon-Polaritons (SPPs) at the metal-dielectric interface, thus the interface between Au layer 116 and ($ZrO_2$) barrier 118 and viewed as a lumped oscillator of energy amplitude a(t). This energy is supplied by the incident wave of amplitude $S_i$ with a rate of k. The reflected wave amplitude, $S_d$, is the result of the incident wave and power coupled from SPPs. Additional energy coupling with SPPs is occurred through excited electron tunneling $t_1$. The operation of the surface plasmon optical modulator 100 is further analyzed in the discussions of FIG. 2-5, hereinafter.

The present invention differs from the "Refractive Index Approach" as discussed in the background as the present invention utilizes electron tunneling to control the excited electron density and can be considered as an external loss for surface plasmon excitation. The reflectivity changes with a small change of resonant frequency. Electron tunneling also enables high speed modulation. The present invention improves modulation efficiency (or increases modulation speed) by engineering the metal-insulator-semiconductor energy band structure to lower the barrier height and by reducing the barrier width of the MIS tunneling diode junction while a change in the dielectric constant $\in_d$ of the MIS tunneling diode junction insulator is not required. Furthermore, the present invention can be developed with conventional semiconductor micro-fabrication materials and equipment and it further allows a monolithic integration with micro-electronic devices.

The present invention also differs from the "Optical Absorption Approach" as in the present invention, optical absorption is realized by electron tunneling mediated through surface plasmons by applying an external bias voltage across the MIS tunneling diode. The decrease of excited electron density, in turn, affects the optical field. There is no constraint that requires that the wavelength needs to correspond to the band edge of the semiconductor materials used. The present invention controls the barrier height of the MIS tunneling diode junction and the width of the materials used, namely the thickness of the metal (e.g., Au) layer of the MIS tunneling diode junction.

The present invention also differs from the "Surface Plasmon Amplification" as the present invention does not require amplification of the surface plasmons of the MIS tunneling diode junction. Furthermore, the present invention does not require wave-guiding to transport surface plasmons from an optical receiving structure to an optical sending structure.

Figure 2:
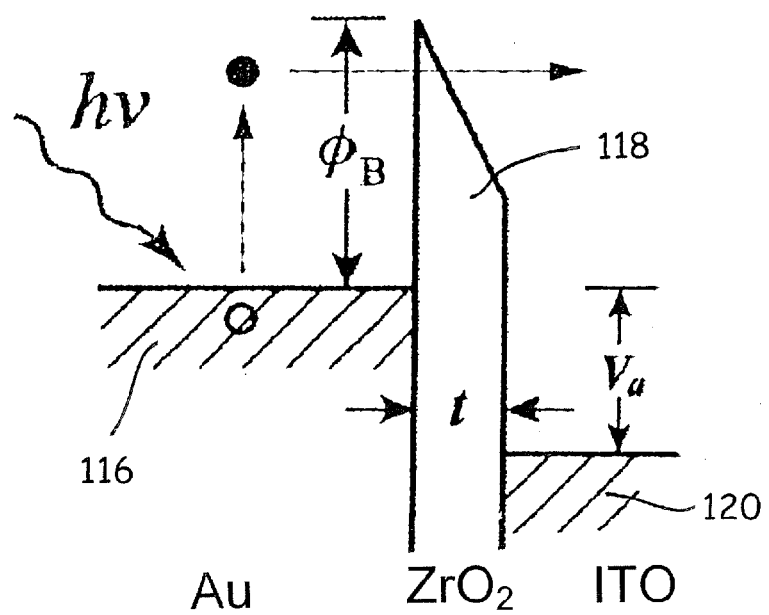
FIG. 2 is a schematical representation of the decay rate of plasmon polariton energy by electron tunneling through a MIS hetero-junction of the tunneling diode.

FIG. 2 is a schematical representation of the decay rate of plasmon polariton energy by electron tunneling through MIS tunneling diode's hetero-junction. Referring now to FIG. 2, as a forward bias $V_a$, defined as having a negative polarity, is applied to the Au layer, the barrier height $\Phi_B$ and the electron's effective mass m*, the schematical representation shows the electrons tunneling through the barrier have a very small probability of re-emitting to the same wavelength as the incident beam. For thin barrier thickness, electron scattering is negligible.

Figure 3:
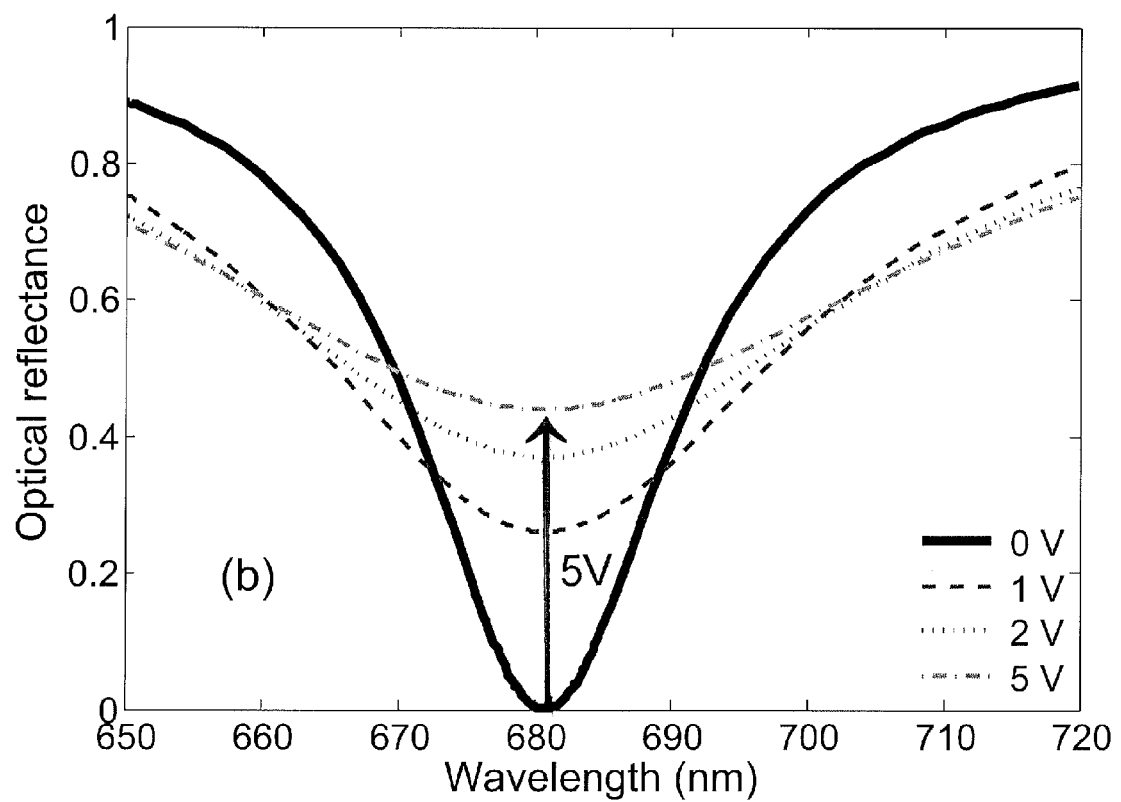
FIG. 3 is a spectral analysis graph of the reflectance of a gold-zirconium dioxide-indium tin oxide (Au—$ZrO_2$-ITO) MIS tunneling diode for different applied biases and an Au layer of 50 nm.

FIG. 3 is a spectral analysis graph of the reflectance of an Au—$ZrO_2$-ITO MIS tunneling diode for different applied biases and an Au layer of approximately 50 nm. Referring now to FIG. 3, various curves represent the optical reflectance versus wavelength of incident light when varying the external applied bias across the metal-insulator-semiconductor (MIS) hetero-junction of the tunneling diode where the Au layer 116 (of FIG. 1) has a thickness of approximately 50 nm. As shown in the spectral analysis curves of FIG. 3, the reflected optical power increases with an increasing external applied bias. For example, at a resonant wavelength of 680 nm, a high distinction ratio can be achieved as the optical reflectance changes from zero (with an applied bias of 0V) to more than 40% at an applied bias of 5V.

Figure 4:
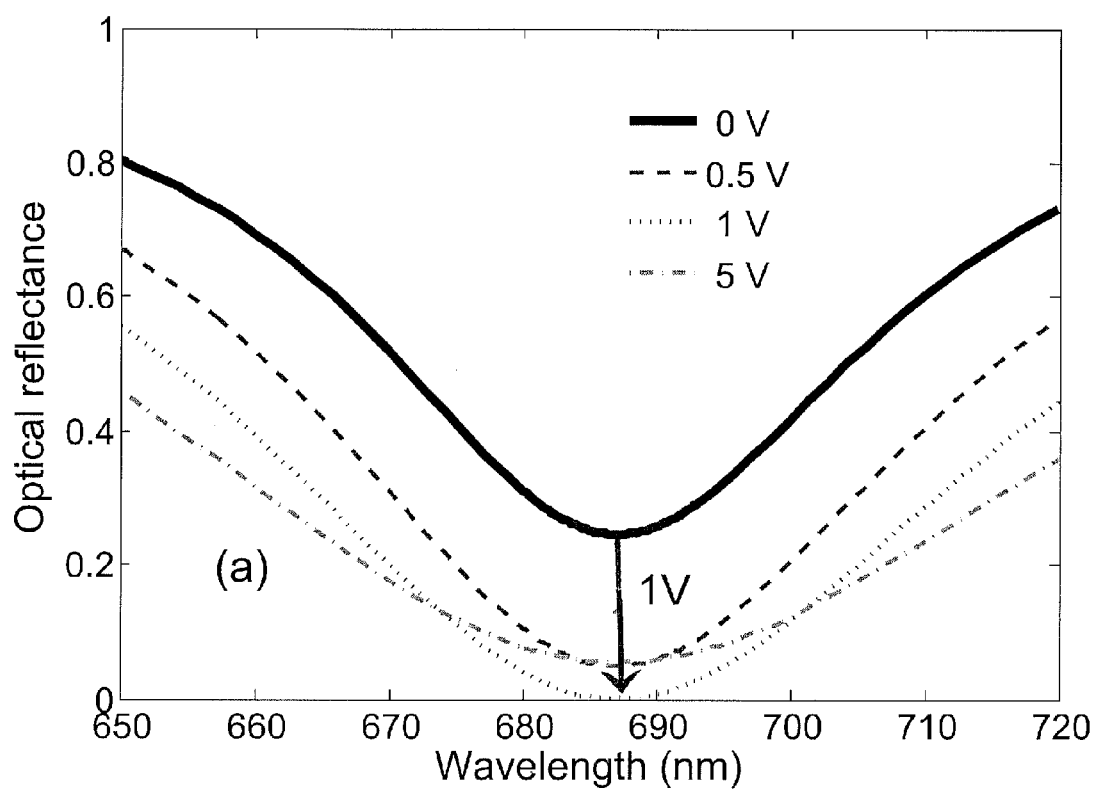
FIG. 4 is a spectral analysis graph of the reflectance of an Au—$ZrO_2$-ITO MIS tunneling diode for different applied biases and an Au layer of 35 nm.

FIG. 4 is a spectral analysis graph of the reflectance of an Au—$ZrO_2$-ITO MIS tunneling diode for different applied biases and an Au layer of 35 nm. Referring now to FIG. 4, various curves represent the optical reflectance versus wavelength of incident light when varying the external applied bias across the metal-insulator-semiconductor (MIS) hetero junction of the tunneling diode where the Au layer 116 (of FIG. 1) has a thickness of approximately 35 mm. As shown in the spectral analysis curves of FIG. 4, the behavior of a device having an Au layer less than 50 nm in thickness is reversed to that of the behavior illustrated in FIG. 3. The optical reflectance is nonzero under no external bias, a result mainly due to the back-scattered SPP field. As forward bias increases, the intensity of the back-scattered field decreases due to electron tunneling of the tunneling diode and is completely compensated at 1V.

Figure 5:
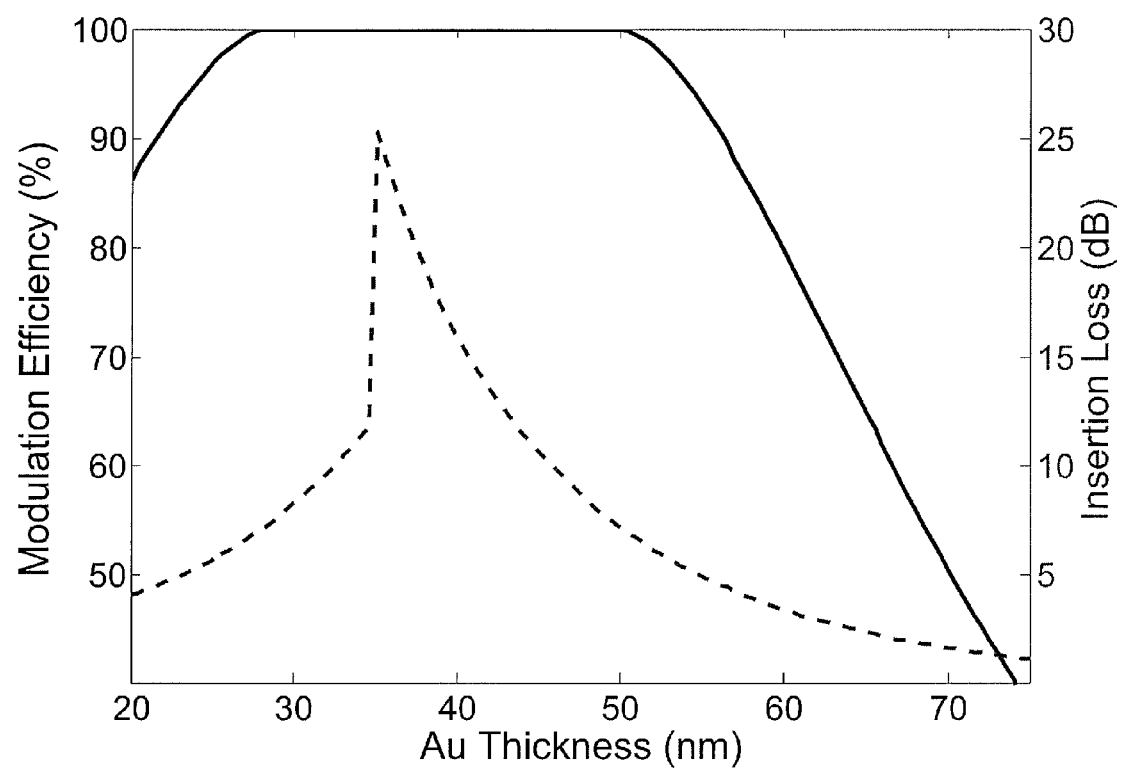
FIG. 5 is a performance analysis graph of the efficiency and insertion loss for the MIS tunneling diode under 5V maximal forward bias as a function of Au layer thickness.

FIG. 5 is a performance analysis graph of the efficiency and insertion loss for the MIS tunneling diode under 5V maximal forward bias as a function of Au layer thickness. Referring now to FIG. 5, the graph shows that 100% modulation efficiency can be achieved for an Au thickness of 30-50 nm. However, for a film thicker than 50 nm, the efficiency deteriorates because the minimal output intensity cannot reach zero.

Figure 6:
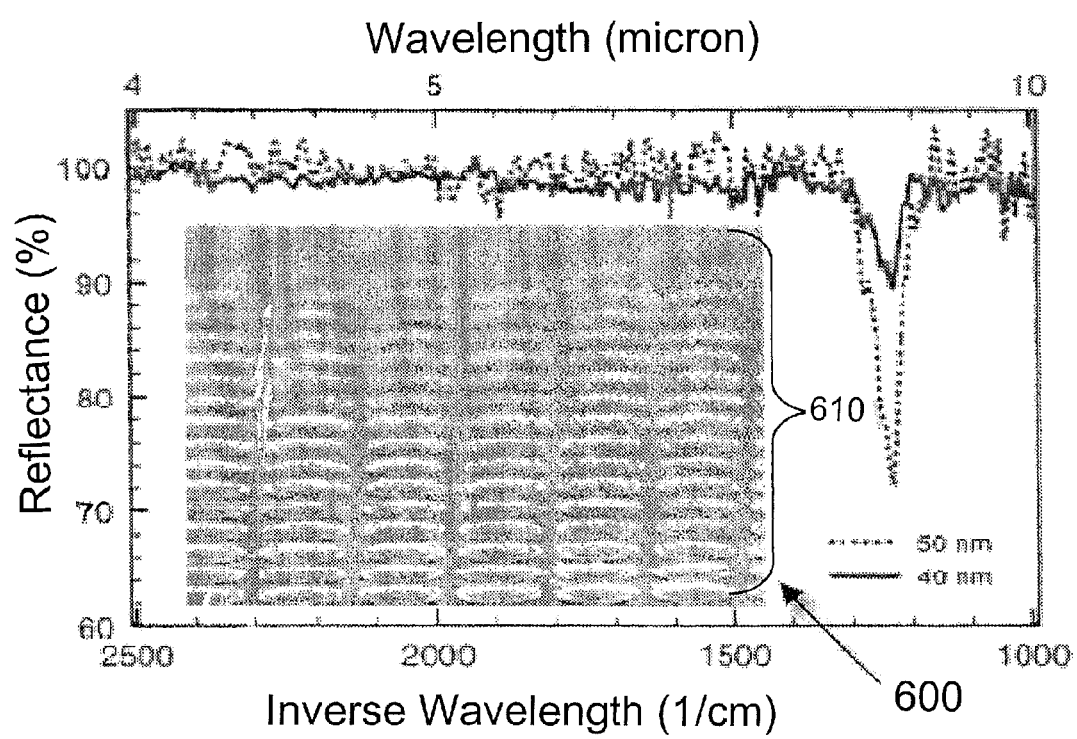
FIG. 6 is an illustration of a phase-match optical element comprising a periodic Au disk with a lattice constant of 1 μm and spectral response measured by Fourier transform infrared (FTIR) spectroscopy.

FIG. 6 is an illustration of a phase-matching optical element 600 that may be implemented in place of a prism or diffraction gratings. The phase-match optical element 600 comprises a periodic Au disk 610 with a lattice constant of 1 µm, such as to build a 10µ×10µ structure. Phase-match optical element 600 allows an efficient coupling of incoming light and surface plasmon. The sub-wavelength periodic structures make a compact optic coupler that is more efficient than a prism of diffraction gratings and the resulting modulator will integrate a periodic structure for small dimension modulators. A spectral response measured by Fourier Transform Infrared (FTIR) spectroscopy shows a decrease in reflectivity at 1250 $cm^{-1}$ and is associated with surface plasmon resonance.

WORKED EXAMPLE

The following description section is presented to enable one to make and use the invention.

Referring to FIG. 1, the surface plasmon optical modulator starts from a silica wafer 114 cleaned by common RCA procedure. Overlying a major surface of the substrate is a hetero-structure including subsequent deposition of Au, $ZrO_2$, and ITO by one of many known techniques to form a metal-insulator-semiconductor tunneling diode. It should be understood that tunneling diode could comprise a sandwich of many appropriate insulators wherein it can be used to affect the barrier characteristics described in the patent description. Electrical contacts, from a low loss metal such as Al, Cu, Au, or W, is formed over layer 116 and layer 120. Means such as a battery 124 and switch are connected between layer 116 and 120 for selectively establishing an electric field normal to the planes of layers 116, 118, 120 in MIS diode 122.

The device 122 is mounted to a semi-cylindrical prism 110 with index matching fluid 112. Alternatively, the aforementioned modulator can be fabricated directly on the flat surface of a semi-cylindrical silica prism, in which case, the index matching fluid shall be ignored. Substrate 114 can alternatively be modified with a periodic corrugation using many known techniques to provide a grated surface, in which case, the modulator can function without the use of a prism.

A monochromatic beam of light is incident to the optical modulator at an angle □ to the normal of the device major surfaces. Light beam is selected, in accordance with the present invention disclosure, such that it is coupled in the surface plasmon polariton mode of the Au surface. This is accomplished by phase matching incident light beam with a surface plasmon polariton mode at the layer 116 by means of prism 110 or grated surface.

In operation, when barrier height of 118 is lowered by applied voltage 124, substantial absorption of surface plasmon polariton mode is achieved through plasmon tunneling. This absorption into the surface plasmon polariton mode leads to a change of reflected optical intensity, in accordance with the patent description.

Although this invention has been described above with reference to particular means, materials and embodiments, it is to be understood by that the invention is not limited to these disclosed particulars, but extends instead to all equivalents with the broad scope of the following claims.

What is claimed is:

1. An optical modulator comprising:
   a phase-matching optically-coupled metal-insulator-semiconductor (MIS) tunneling diode having an external bias ranging from a voltage greater than an absolute value of 0V to the absolute value of 5V;
   said optically-coupled metal-insulator-semiconductor (MIS) tunneling diode comprising a metal-insulator-semiconductor structure where the metal is a metal layer of 50 nm or less in thickness and a phase matching optical element; and
   said external bias is applied across said insulator such that it affects optical reflectance of Surface Plasmon-Polaritons (SPPs) with said optical modulator;
   wherein said metal-insulator-semiconductor structure comprises a gold-zirconium dioxide-indium tin oxide (Au—$ZrO_2$-ITO) structure, where said gold (Au) layer is 50 nm or less in thickness and said zirconium oxide ($ZrO_2$) is approximately 4 nm in thickness.

2. An optical modulator comprising:
   a phase-matching optically-coupled metal-insulator-semiconductor (MIS) tunneling diode having an external bias ranging from a voltage greater than an absolute value of 0V to the absolute value of 5V;
   said optically-coupled metal-insulator-semiconductor (MIS) tunneling diode comprising a metal-insulator-semiconductor structure where the metal is a metal layer of 50 nm or less in thickness and a phase matching optical element; and
   said external bias is applied across said insulator such that it affects optical reflectance of Surface Plasmon-Polaritons (SPPs) with said optical modulator; wherein said optically-coupled metal-insulator-semiconductor (MIS) tunneling diode is a gold lattice-coupled MIS tunneling diode.

* * * * *